(12) United States Patent
Maeda et al.

(10) Patent No.: US 9,764,789 B2
(45) Date of Patent: Sep. 19, 2017

(54) SIDE COVER STRUCTURE OF SADDLE-RIDE-TYPE VEHICLE

(71) Applicant: HONDA MOTOR CO., LTD., Tokyo (JP)

(72) Inventors: Rui Maeda, Wako (JP); Soya Uchida, Wako (JP); Koji Koyano, Wako (JP); Yasuhiro Ohashi, Wako (JP); Daiki Hamaguchi, Wako (JP); Koji Mizuta, Wako (JP); Hiroyuki Sasazawa, Wako (JP); Yukitou Fujimoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 33 days.

(21) Appl. No.: 14/969,926

(22) Filed: Dec. 15, 2015

(65) Prior Publication Data
US 2016/0214672 A1 Jul. 28, 2016

(30) Foreign Application Priority Data
Jan. 23, 2015 (JP) .................................. 2015-011554

(51) Int. Cl.
*B62J 17/00* (2006.01)
(52) U.S. Cl.
CPC .................................... *B62J 17/00* (2013.01)
(58) Field of Classification Search
CPC ... B62J 23/00; B62J 17/00; B62J 17/02; B62J 17/04
See application file for complete search history.

(56) References Cited

U.S. PATENT DOCUMENTS

| | | | | |
|---|---|---|---|---|
| 7,445,075 B2* | 11/2008 | Ozawa | ................... | B60J 5/0487 180/291 |
| 8,177,250 B2* | 5/2012 | Fukuyama | ............... | B62J 17/00 180/229 |
| 2006/0113815 A1* | 6/2006 | Ohzono | ................... | B62J 17/00 296/37.1 |
| 2007/0024089 A1* | 2/2007 | Takeshita | ................. | B62J 17/02 296/192 |
| 2008/0093147 A1* | 4/2008 | Tanaka | ....................... | B62J 6/02 180/219 |
| 2009/0051140 A1* | 2/2009 | Saguchi | ................. | B62K 25/08 280/304.3 |
| 2009/0108629 A1* | 4/2009 | Takahashi | .............. | B62K 11/04 296/192 |

(Continued)

FOREIGN PATENT DOCUMENTS

| | | | |
|---|---|---|---|
| JP | 62-203792 A | | 12/1987 |
| JP | 2009161027 A | * | 7/2009 |

(Continued)

*Primary Examiner* — Anne Marie Boehler
*Assistant Examiner* — Gabriela C Craciun
(74) *Attorney, Agent, or Firm* — Birch, Stewart, Kolasch & Birch, LLP

(57) ABSTRACT

A side cover structure for enhancing the external appearance and turning performance of a saddle-ride-type vehicle. A side cover structure of a saddle-ride-type vehicle includes a head pipe with a frame extending rearwardly from the head pipe. Side covers cover the frame from left and right sides. A bent portion is bent toward the outside in a vehicle width direction from a base portion and is formed on the side cover. An opening is formed in the base plate portion positioned in the vicinity of the bent portion.

19 Claims, 8 Drawing Sheets

(56) References Cited

U.S. PATENT DOCUMENTS

| | | | | |
|---|---|---|---|---|
| 2009/0189413 | A1* | 7/2009 | Misaki | B62J 17/04 |
| | | | | 296/180.1 |
| 2009/0194353 | A1* | 8/2009 | Kato | B62J 23/00 |
| | | | | 180/311 |
| 2013/0320691 | A1* | 12/2013 | Oshita | B60N 3/00 |
| | | | | 296/37.1 |
| 2015/0083512 | A1* | 3/2015 | Maeda | B62J 17/00 |
| | | | | 180/229 |
| 2015/0166137 | A1* | 6/2015 | Yamazaki | B62J 23/00 |
| | | | | 280/304.3 |
| 2015/0166139 | A1* | 6/2015 | Inomori | B62K 11/04 |
| | | | | 180/219 |
| 2016/0016623 | A1* | 1/2016 | Ishii | B62J 17/00 |
| | | | | 180/229 |
| 2016/0288853 | A1* | 10/2016 | Ishii | B62J 17/00 |
| 2016/0304145 | A1* | 10/2016 | Ishii | B62J 1/28 |
| 2017/0021887 | A1* | 1/2017 | Wada | B62J 17/04 |

FOREIGN PATENT DOCUMENTS

| | | | | |
|---|---|---|---|---|
| JP | 2010162990 A | * | 7/2010 | |
| JP | 2012071779 A | * | 4/2012 | B62J 17/02 |

* cited by examiner

SIDE COVER STRUCTURE OF SADDLE-RIDE-TYPE VEHICLE

CROSS-REFERENCE TO RELATED APPLICATIONS

The present application claims priority under 35 USC 119 to Japanese Patent Application No. 2015-011554 filed Jan. 23, 2015 the entire contents of which are hereby incorporated by reference.

BACKGROUND OF THE INVENTION

1. Field of the Invention

The present invention relates to a side cover structure of a saddle-ride-type vehicle.

2. Description of Background Art

A technique is known wherein a bent portion is formed on a side cover of a saddle-ride-type vehicle with an opening being formed in the bent portion. See, for example, JP-A-62-203792. In JP-A-62-203792, the opening is formed for allowing a user to confirm an electrolyte solution in a battery arranged on a rear portion of the vehicle or a liquid surface in an oil reservoir tank. The opening is positioned on a side of the battery or the like and below a seat.

In the above-mentioned conventional side cover structure, the bent portion is emphasized as a factor for enhancing the external appearance (design property). Thus, it is difficult to say that the opening formed in the bent portion contributes to the turning performance of the saddle-ride-type vehicle. In view of the above, there has been a demand for an enhancement of the turning performance of a saddle-ride-type vehicle while enhancing the external appearance by the bent portion.

SUMMARY AND OBJECTS OF THE INVENTION

The invention has been made in view of the above-mentioned circumstances. It is an object of an embodiment of the present invention to provide a side cover structure of a saddle-ride-type vehicle which can enhance external appearance and turning performance of the saddle-ride-type vehicle.

To achieve the above-mentioned object, the invention provides a side cover structure of a saddle-ride-type vehicle which includes a head pipe (14); a frame (15) extending rearwardly from the head pipe (14); and side covers (55) for covering the frame (15) from left and right sides, wherein a bent portion (89, 92) which is bent toward the outside in a vehicle width direction from a base portion (85) is formed on the side cover (55), and an opening (90, 93) is formed in the base portion (85) positioned in the vicinity of the bent portion (89, 92).

According to an embodiment of the present invention, in the saddle-ride-type vehicle, the bent portion which is bent toward the outside in the vehicle width direction from the base portion is formed on the side cover, and the opening is formed in the base portion positioned in the vicinity of the bent portion. With such a configuration, the external appearance can be enhanced by the bent portion and, at the same time, at the time of turning the saddle-ride-type vehicle in a tilted posture, a flow of air passes through the opening from the side cover and passes through the inside of the saddle-ride-type vehicle. Thus, resistance to turning is reduced whereby the turning performance is enhanced. Also with such a configuration, the flow direction of the flow of air is changed by the bent portion and the flow of air through the opening. Thus, it is possible to make a smooth flow of air whereby the turning performance can be largely enhanced.

According to an embodiment of the present invention, the opening (90a, 90b, 90c, 93a) is arranged at a position which overlaps with the head pipe (14) as viewed in a side view or at a position in front of the head pipe (14) as viewed in a side view.

According to an embodiment of the present invention, the opening is arranged at a position which overlaps with the head pipe or at a position in front of the head pipe as viewed in a side view. Thus, it is possible to straighten a strong a flow of air on a front portion side of the saddle-ride-type vehicle by the bent portion whereby the flow of air can smoothly flow to the opening. Accordingly, the saddle-ride-type vehicle can have an enhance turning performance.

The side cover (55) includes a base side cover (71) which includes the base portion (85); and an outer side cover (72) for covering the base side cover (71), and the opening (90, 93) is concealed by the outer side cover (72).

According to an embodiment of the present invention, the opening is concealed by the outer side cover. Thus, it is possible to prevent the opening from being viewed from the outside by the outer side cover whereby the turning performance can be enhanced while ensuring the external appearance.

According to an embodiment of the present invention, a projecting portion (86) for projecting toward the outside in a vehicle width direction from the base portion (85) is formed by the bent portion (89). The projecting portion (86) has an approximately wing cross-sectional shape as viewed in a side view.

According to an embodiment of the present invention, the projecting portion which projects toward the outside in the vehicle width direction from the base portion is formed by the bent portion, and the projecting portion has an approximately wing cross-sectional shape as viewed in a side view. Thus, a resistance generated by a flow of air toward the projecting portion from a front side can be reduced. Accordingly, the external appearance can be enhanced by the projecting portion and, at the same time, a resistance of the flow of air generated by the projecting portion can be reduced.

According to an embodiment of the present invention, the outer side cover (72) includes an upper outer side cover (73); and a lower outer side cover (74) positioned below the upper outer side cover (73). A connecting line (77) is formed by connecting a lower end (73c) of the upper outer side cover (73) and an upper end (74c) of the lower outer side cover (74) and extends frontward and downwardly as viewed in a side view.

According to an embodiment of the present invention, the connecting line which is formed by connecting the lower end of the upper outer side cover and the upper end of the lower outer side cover extends frontward and downwardly as viewed in a side view. Accordingly, the outer side cover can provide a design having a feeling of speed. Thus, the external appearance can be enhanced.

According to an embodiment of the present invention, a cowl (70) having a beak shape as viewed in a side view is disposed below a headlight (60), and an upper edge (70a) of the cowl (70) is contiguously formed with the connecting line (77).

According to an embodiment of the present invention, the cowl having a beak shape as viewed in a side view is disposed below the headlight, and the upper edge of the cowl is contiguously formed with the connecting line. Thus, a design having the feeling of integrity can be formed on a front portion of the vehicle by the upper edge of the cowl and the connecting line and the external appearance can be enhanced.

According to an embodiment of the present invention, the projecting portion (86) is positioned on the upper outer side cover (73).

According to an embodiment of the present invention, the projecting portion is positioned on the upper outer side cover. Thus, resistance generated at the upper portion of the saddle-ride-type vehicle where the resistance is increased at the time of turning the vehicle can be effectively reduced thus enhancing the turning performance.

According to an embodiment of the present invention, the projecting portion (86) is formed into a hollow columnar shape projecting toward the outside in a vehicle width direction with a plurality of openings (90) being formed along a periphery of a proximal end portion of the projecting portion (86).

According to an embodiment of the present invention, the projecting portion is formed into a hollow columnar shape projecting toward the outside in the vehicle width direction with the plurality of openings being formed along the periphery of the proximal end portion of the projecting portion. Accordingly, a plurality of openings can be effectively formed in the vicinity of the bent portion. Thus, the turning performance of the saddle-ride-type vehicle can be enhanced.

According to an embodiment of the present invention, the projecting portion (86) is made to pass through a side surface opening (76) formed in the outer side cover (72) and extends toward the outside in a vehicle width direction with the opening (90) overlapping with a peripheral portion (76*a*) of the side surface opening (76) from the inside as viewed in a side view.

According to an embodiment of the present invention, the projecting portion is made to pass through the side surface opening formed in the outer side cover and extends toward the outside in the vehicle width direction, and the opening overlaps with the peripheral portion of the side surface opening from the inside as viewed in a side view. Accordingly, a plurality of openings can be effectively formed in a proximal end portion side of the columnar projecting portion with the plurality of openings being concealed with the simple constitution by the peripheral portion of the side surface opening. Accordingly, it is possible to acquire both of turning performance and external appearance at the same time.

In the side cover structure of a saddle-ride-type vehicle of the invention, the external appearance can be enhanced by the bent portion and, at the same time, it is possible to make a smooth flow of air by the bent portion to thus enhance the turning performance.

It is also possible to straighten a strong flow of air generated on a front portion side of the saddle-ride-type vehicle by the bent portion thus providing the smooth flow of the flow of air through the opening.

The opening is concealed by the outer side cover. Thus, turning performance can be enhanced while ensuring the external appearance.

The external appearance can be enhanced by the projecting portion and, at the same time, the resistance of a flow of air generated by the projecting portion can be reduced.

The outer side cover can acquire a design of speed to enhance the external appearance.

A design having feeling of integrity can be formed on the front portion by the upper edge of the cowl having a beak shape and the connecting line. Thus, the external appearance can be enhanced.

The resistance generated by the upper portion of the saddle-ride-type vehicle can be effectively reduced to enhance the turning performance.

Further, a plurality of openings can be effectively formed along the periphery of the proximal end portion of the projecting portion having a hollow columnar shape. Thus, the turning performance of the saddle-ride-type vehicle can be enhanced.

The plurality of openings can be concealed with the simple constitution by the peripheral portion of the side surface opening to make it possible to acquire both the turning performance and the external appearance at the same time.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, an embodiment of the invention is described with reference to the drawings. In the description, directions of "front," "rear," "left," "right," "up" and "down" are equal to the directions of a vehicle body unless otherwise specified. In the respective drawings, symbol FR indicates a front side of the vehicle body, symbol UP indicates an upper side of the vehicle body, and symbol LH indicates a left side of the vehicle body.

Figure 1:
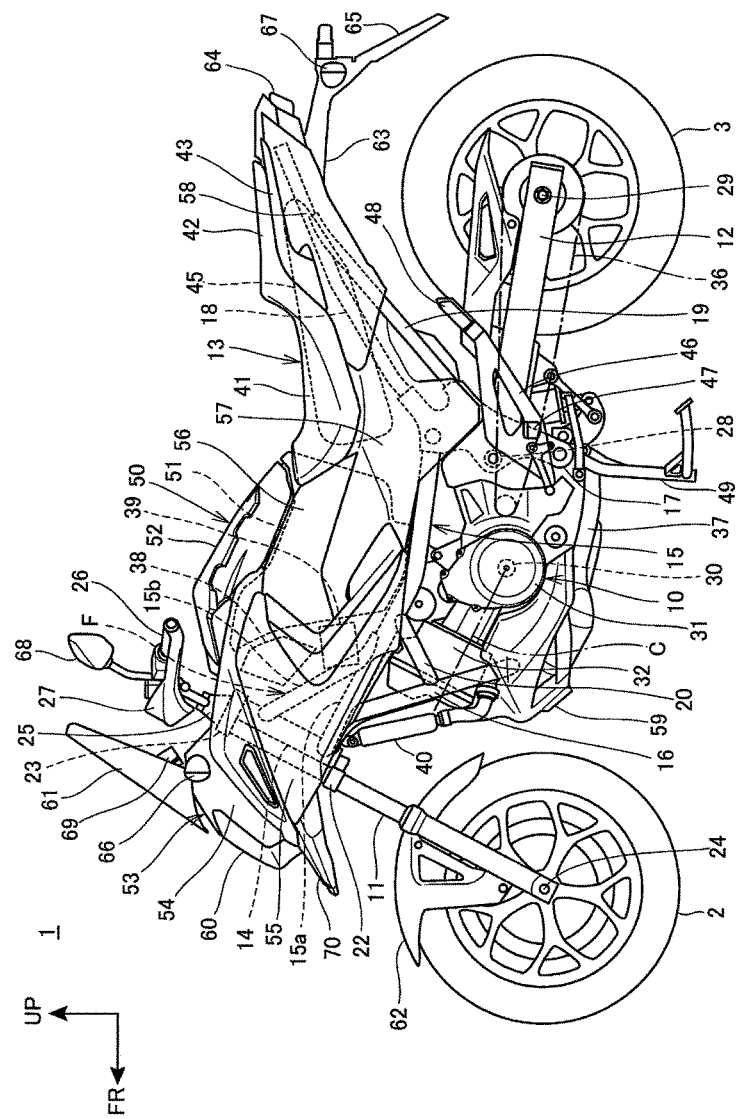
FIG. 1 is a left side view of a motorcycle according to an embodiment of the invention.

FIG. 1 is a left side view of a motorcycle according to an embodiment of the invention. In FIG. 1, with respect to each pair of left and right parts, only a left part is illustrated.

The motorcycle 1 is a vehicle wherein an engine 10 forming a power unit is supported on a vehicle body frame F. A pair of left and right front forks 11, 11 steerably supports a front wheel 2 on a front end of a vehicle body frame F in a steerable manner. A swing arm 12 for supporting a rear wheel 3 is mounted on a rear portion side of the vehicle body frame F. The motorcycle 1 is a saddle-ride-type vehicle where a seat 13 on which an occupant sits in a straddling manner is arranged above a rear portion of the vehicle body frame F.

The vehicle body frame F includes a head pipe 14 mounted on a front end of the vehicle body frame F; a pair of left and right main frames 15, 15 (frames) extending rearwardly and downwardly from a lower portion of the head pipe 14; a pair of left and right down frames 16, 16 extending rearwardly and downwardly from front end portions of the main frames 15, 15; a pair of left and right pivot frames 17, 17 extending downwardly from rear ends of the main frames 15, 15; a pair of left and right seat frames 18, 18 extending rearwardly and upwardly to a rear end portion of the vehicle from upper ends of the pivot frames 17, 17; and a pair of left and right sub frames 19, 19 extending rearwardly and upwardly from upper portions of the pivot frames 17, 17 and being connected to rear portions of the seat frames 18, 18.

Each main frame 15 has a main frame body portion 15a extending rearwardly and downwardly from a lower portion of the head pipe 14 with a relatively gentle inclination; and a reinforcing frame portion 15b for connecting an upper portion of the head pipe 14 and an intermediate portion of the main frame body portion 15a to each other. The vehicle body frame F also includes a pair of left and right connecting frames 20, 20 for connecting the intermediate portions of the main frame body portions 15a, 15a and the down frames 16, 16 to each other.

A steering shaft (not shown in the drawing) is rotatably and pivotally supported on the head pipe 14, and a bottom bridge 22 and a top bridge 23 extending in the vehicle width direction are fixed to a lower end portion and an upper end portion of the steering shaft respectively. The front forks 11, 11 are supported on the bottom bridge 22 and the top bridge 23, and the front wheel 2 is pivotally supported on a front wheel axle 24 which is mounted on lower ends of the front forks 11, 11. The top bridge 23 has a handle holder 25 extending upwardly from an upper surface of the top bridge 23, and a handle bar 26 for steering extending in the vehicle width direction that is supported on the handle holder 25. Knuckle guards 27, 27 are mounted on the handle bar 26.

The swing arm 12 has a front end portion thereof pivotally supported on a pivot shaft 28 which connects the left and right pivot frames 17, 17 to each other. Thus, the swing arm 12 is swingable in the vertical direction about the pivot shaft 28. The rear wheel 3 is pivotally supported on a rear wheel axle 29 which penetrates a rear end portion of the swing arm 12.

A rear suspension (not shown in the drawing) is disposed between the swing arm 12 and the vehicle body frame F.

The engine 10 includes a crankcase 31 for supporting a crankshaft 30 extending in the vehicle width direction; and a cylinder portion 32 extending frontward and upwardly from a front side of a front portion of the crankcase 31.

The engine 10 is an engine of a type where a cylinder axis C of the cylinder portion 32 is arranged in a frontwardly inclined manner such that the cylinder axis C is closer to the horizontal direction than the vertical direction, and a space for arranging parts is secured above the engine 10.

An output of the engine 10 is transmitted to the rear wheel 3 through a chain 36 provided between an output shaft (not shown in the drawing) of the engine 10 and the rear wheel 3.

An exhaust pipe 37 of the engine 10 is pulled out downwardly from a cylinder head of the cylinder portion 32, extends rearwardly after passing through an area below the engine 10, and is connected to a muffler (not shown in the drawing).

An air cleaner box 38 which purifies air supplied to the engine 10 is arranged above front portions of the main frames 15, 15 and behind the head pipe 14. Air which passes through the air cleaner box 38 flows into the cylinder head of the cylinder portion 32 after a flow rate is adjusted by a throttle body (not shown in the drawing). A battery 39 is arranged between the air cleaner box 38 and the main frame body portions 15a, 15a. A radiator 40 of the engine 10 is arranged below the head pipe 14 and in front of the cylinder portion 32.

The seat 13 includes a front seat 41 for a rider and a rear seat 42 for a pillion passenger which is one step higher than the front seat 41. The front seat 41 is arranged above the pivot frames 17, 17 and the front portions of the seat frames 18, 18. The rear seat 42 is arranged above the seat frames 18, 18. Grips 43, 43 which the pillion passenger seated on the rear seat 42 grips are disposed on left and right sides of the rear seat 42, respectively.

A fuel tank 45 is arranged between the front seat 41, the rear seat 42, and the seat frames 18, 18.

A pair of left and right step holders 46, 46 is arranged on outer sides of the pivot frames 17, 17, respectively, with steps 47, 47 for a rider being fixed to front portions of the respective step holders 46. Tandem steps 48, 48 for a pillion passenger are fixed to rear portions of the respective step holders 46.

A main stand 49 is connected to lower portions of the pivot frames 17, 17.

A storage box 50 is provided above rear portions of the main frames 15, 15 and between the front seat 41 and the head pipe 14. The storage box 50 includes a box body 51 which has an upper surface thereof opened; and a box lid 52 for closing an opening formed on the upper surface in an openable and closeable manner.

The box body 51 has enough capacity to store one full face type helmet. The air cleaner box 38 and the battery 39 are arranged between the box body 51 and the head pipe 14.

The motorcycle 1 includes a resin-made vehicle body cover 53 which covers the vehicle body. The vehicle body cover 53 includes a front cowl 54 positioned in front of the head pipe 14; a pair of left and right side covers 55, 55 for covering the head pipe 14 and the front portions of the main frames 15, 15 from the sides; a pair of left and right box side covers 56, 56 arranged between the side covers 55, 55 and the front seat 41 for covering an upper portion of the box body 51 from sides; a pair of left and right middle covers 57, 57 disposed above the main frames 15, 15 for covering a lower portion of the box body 51 and a lower portion of the front seat 41; a rear cowl 58 disposed below the rear seat 42 for covering the seat frames 18, 18 and the sub frames 19, 19; an undercover 59 for covering the engine 10 from below; and a beak-shaped cowl 70 projecting frontward and downwardly in a beak shape from a lower side of the front cowl 54. The beak-shaped cowl 70 has a shape tapered toward a front end side thereof in the vertical direction as well as in the vehicle width direction. The box side covers 56, 56 are also portions which a rider grips by his knees.

The headlight 60 is integrally mounted on a center portion of the front cowl 54 in the vehicle width direction. The beak-shaped cowl 70 projects frontward from the headlight 60.

A wind screen 61 is mounted on an upper portion of the front cowl 54. A front fender 62 is fixed to the front forks 11, 11.

A rear fender 63 is arranged above the rear wheel 3, and covers the fuel tank 45 from below. A tail lamp 64 is mounted on a rear end portion of the rear cowl 58 above a rear end portion of the rear fender 63. A license plate holder 65 is fixed to a rear end of the rear fender 63.

Front blinkers 66, 66 are fixed to the front cowl 54, and rear blinkers 67, 67 are fixed to the rear fender 63. Rear mirrors 68, 68 are fixed to the handle bar 26. Meters 69 which display a speed and the like are arranged behind the wind screen 61 and above the front cowl 54.

Figure 2:
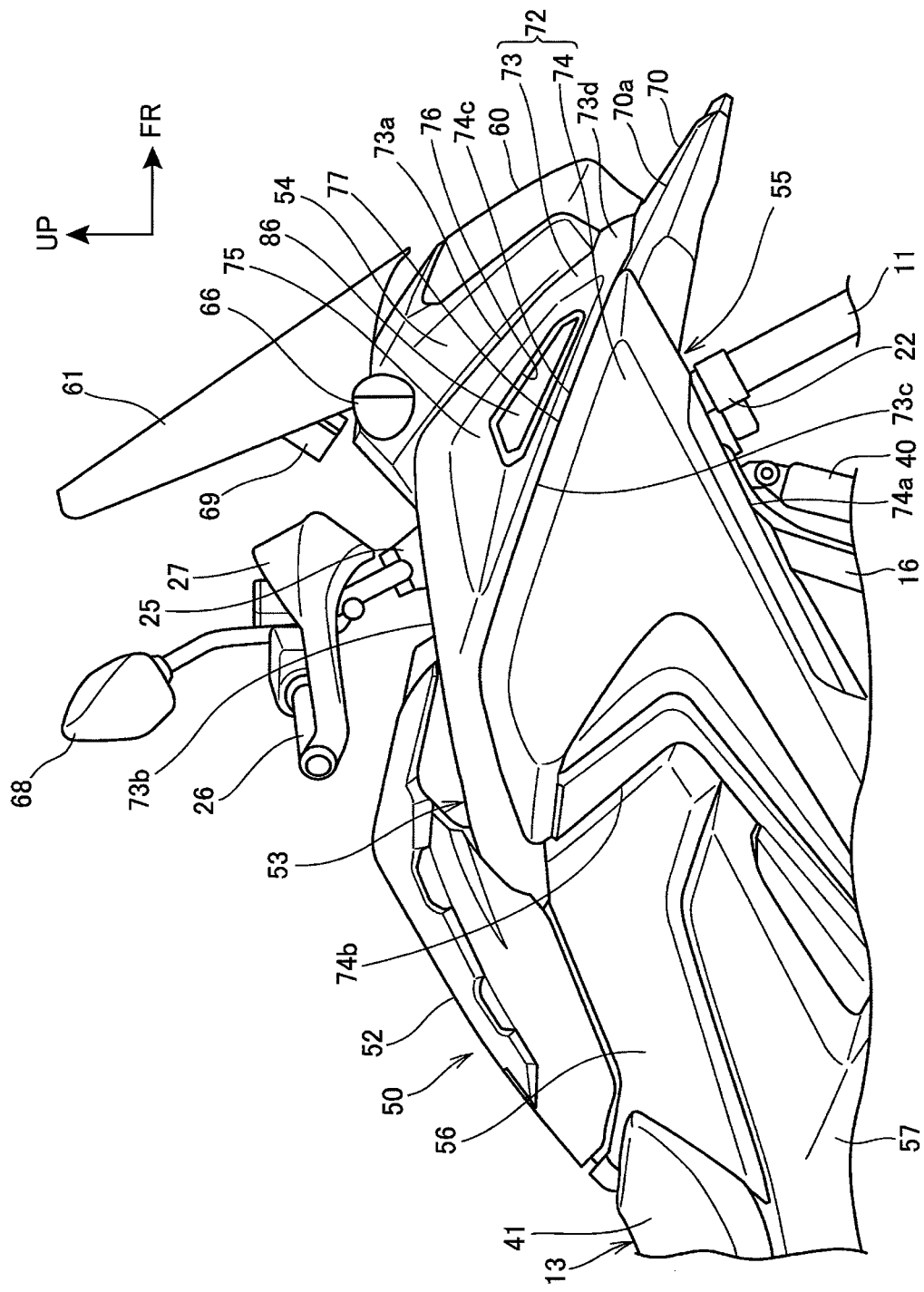
FIG. 2 is a right side view of a front portion of the motorcycle.
Figure 3:
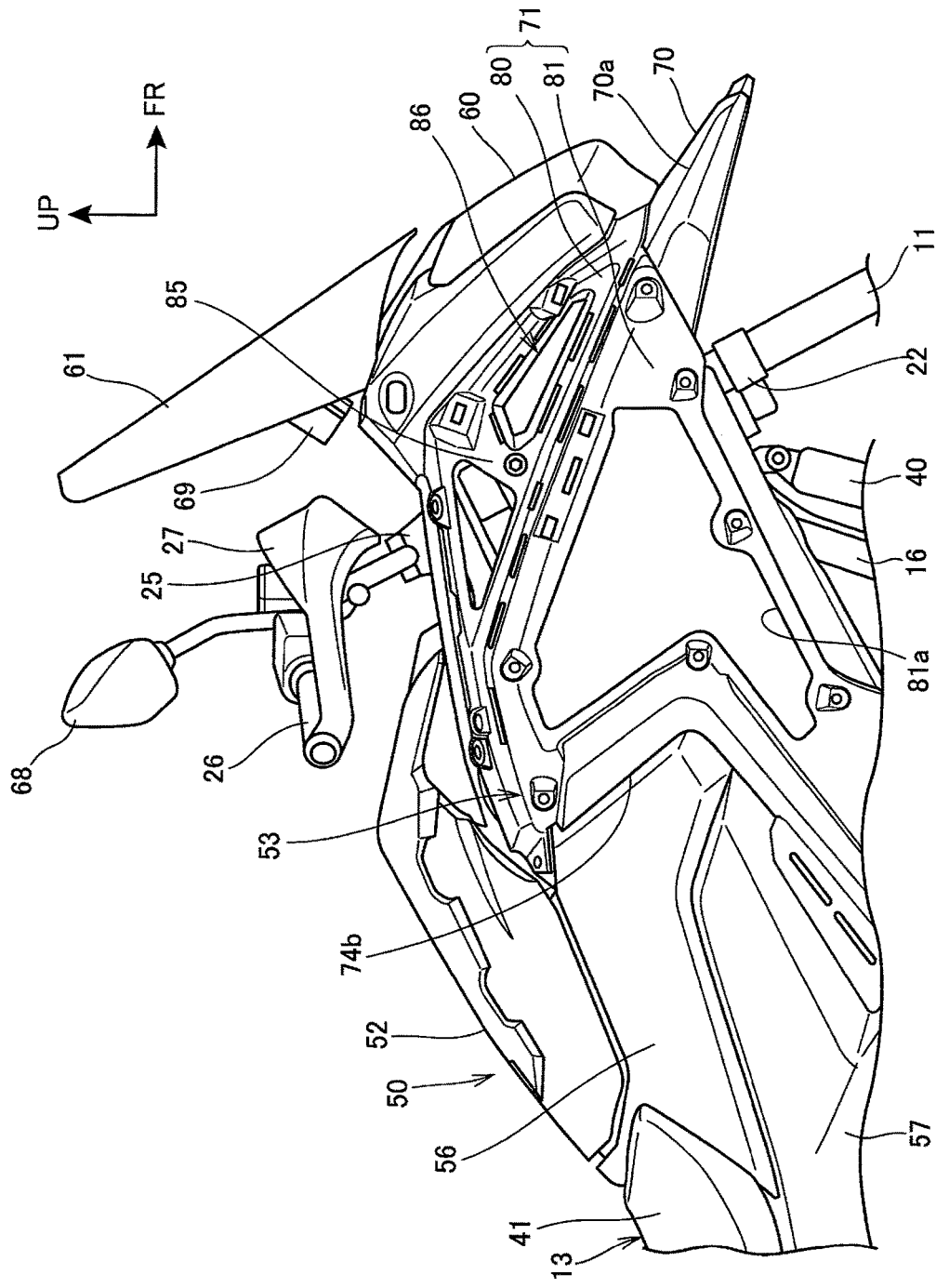
FIG. 3 is a view showing a state where some side covers are removed from FIG. 2.
Figure 4:
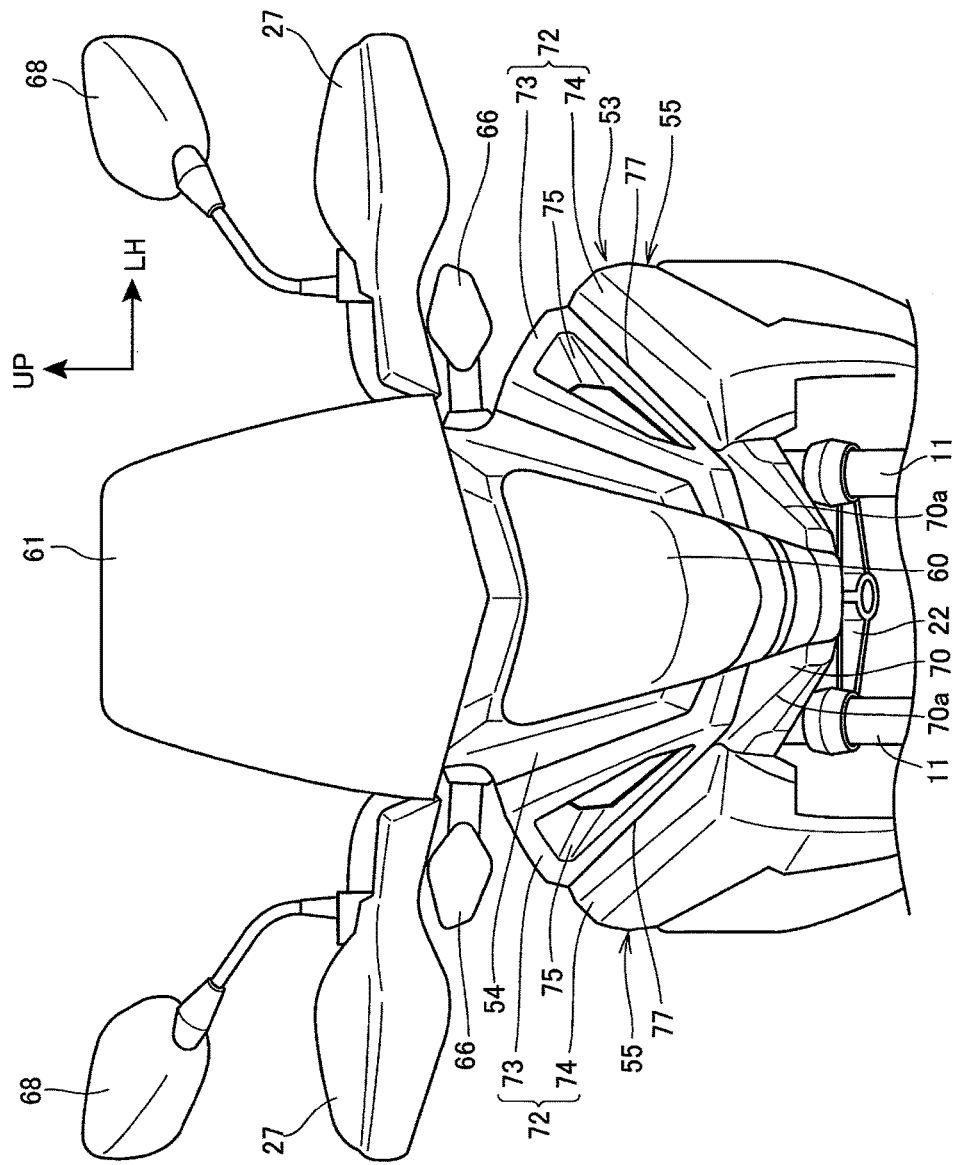
FIG. 4 is a front view of a front portion of a motorcycle.

FIG. 2 is a right side view of a front portion of the motorcycle 1. FIG. 3 is a view showing a state where a part of the side cover 55 is removed from the motorcycle 1 shown in FIG. 2. FIG. 4 is a front view of a front portion of the motorcycle 1. The side covers 55, 55 are configured in left and right symmetry and hence, the right side cover 55 is described in detail in this embodiment.

By reference to FIG. 2 to FIG. 4, the side cover 55 includes a plate-shaped base side cover 71 mounted on a vehicle body frame F side (FIG. 3); and an outer side cover 72 mounted on an outer side surface of the base side cover 71.

The outer side cover 72 includes an upper outer side cover 73 which is contiguously formed with a rear edge portion of the front cowl 54; and a lower outer side cover 74 which extends downwardly contiguously from the upper outer side cover 73. FIG. 3 shows a state where the upper outer side cover 73 and the lower outer side cover 74 are removed and the base side cover 71 is exposed.

The upper outer side cover 73 is formed into an elongated plate shape which is elongated in the longitudinal direction rather than in the vertical direction. The upper outer side cover 73 includes a front upper edge 73a which extends rearwardly and upwardly along a rear edge portion of the front cowl 54; a rear upper edge 73b which is bent at a portion thereof in the vicinity of a rear end of the front cowl 54 and extends rearwardly and downwardly; and a lower edge 73c (lower end) which extends rearwardly along the front upper edge 73a and the rear upper edge 73b. A front end 73d of the upper outer side cover 73 is positioned between a front end portion of the front cowl 54 and an upper surface of a rear end portion of the beak-shaped cowl 70. A rear end of the upper outer side cover 73 is positioned in the vicinity of an intermediate portion of the box lid 52 in the longitudinal direction.

The upper outer side cover 73 has a front portion thereof positioned in front of the head pipe 14 (FIG. 1) and has a rear portion thereof overlapping with the upper portion of the head pipe 14 as viewed in a side view.

A funnel-shaped recessed portion 75 whose size is gradually decreased toward an inner side in the vehicle width direction is formed on a front portion of the upper outer side cover 73. A side surface opening 76 is formed in a bottom portion of the recessed portion 75. The recessed portion 75 and the side surface opening 76 extend rearwardly and upwardly and are formed into a longitudinally elongated shape as viewed in a side view.

The lower outer side cover 74 extends downwardly contiguously from the lower edge 73c of the upper outer side cover 73 and, as shown in FIG. 1, covers the head pipe 14, the front portions of the main frames 15, 15, the air cleaner box 38, and the battery 39. A lower edge 74a of the lower outer side cover 74 extends rearwardly and downwardly along the main frame body portion 15a. A rear edge 74b of the lower outer side cover 74 is contiguously formed with a front edge of the box side cover 56 and a front edge of the middle cover 57.

A connecting line 77 (FIG. 2) which is formed by connecting an upper edge 74c (upper end) of the lower outer side cover 74 and a lower edge 73c of the upper outer side cover 73 is contiguously formed with an upper edge 70a of the beak-shaped cowl 70 and extends frontward and downwardly. The upper edge 70a is a ridge line formed on left and right side portions which partitions an upper surface and a side surface of the beak-shaped cowl 70 as viewed in a side view.

The left and right upper outer side covers 73 and the left and right lower outer side covers 74 are, as shown in FIG. 4, mounted in an inclined manner such that a width of the left and right upper outer side covers 73 in the vehicle width direction and a width of the left and right lower outer side covers 74 in the vehicle width direction are gradually increased toward a rear side. Further, recessed portions 75, 75 are also inclined such that the more rearwardly the recessed portion 75, 75 extends, the larger a width of the recessed portion 75, 75 becomes.

Figure 5:
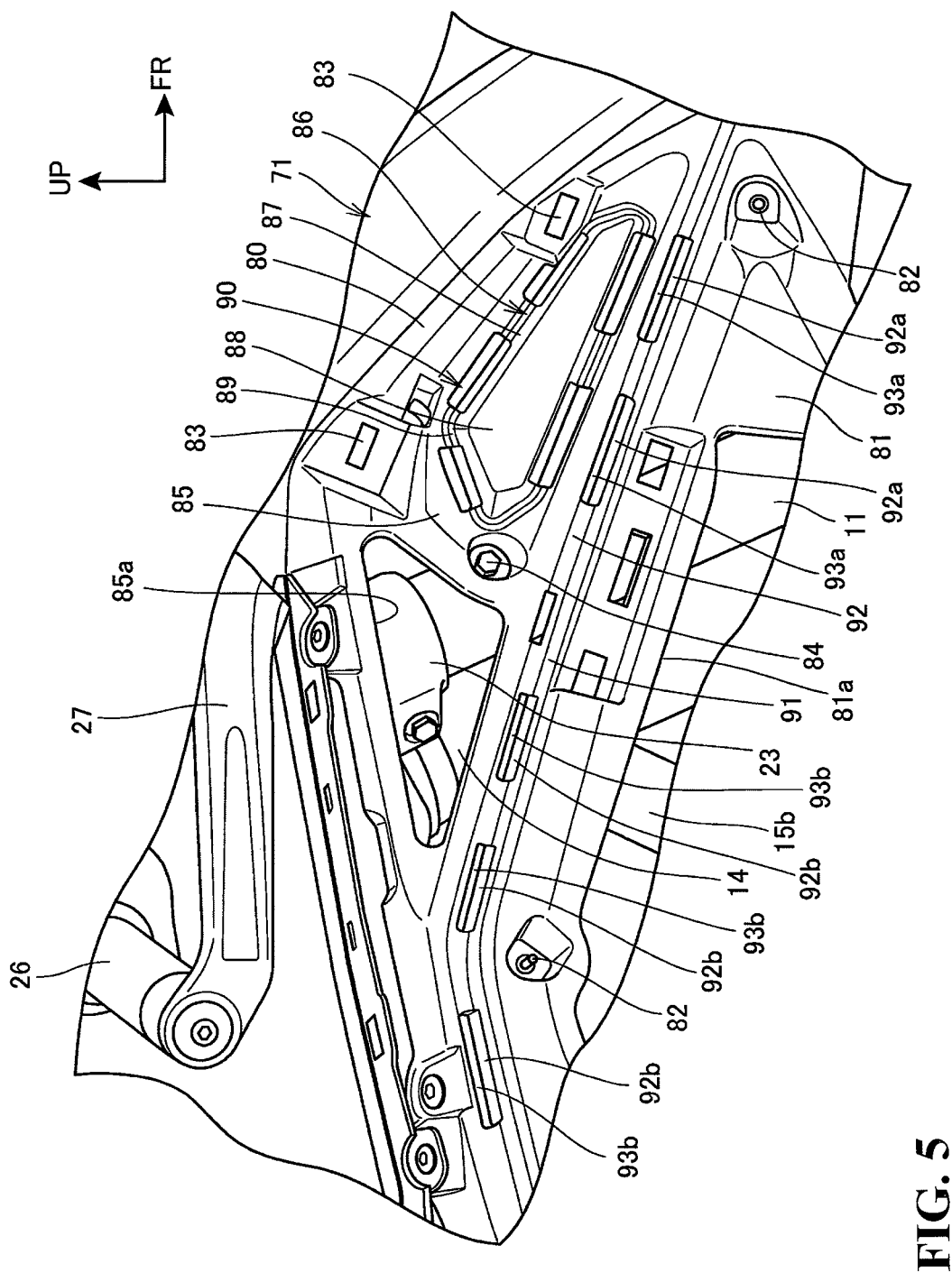
FIG. 5 is a view showing an upper portion of a base side cover in an enlarged manner.

FIG. 5 is a view showing an upper portion of the base side cover 71 in an enlarged manner.

As shown in FIG. 3 and FIG. 5, the base side cover 71 includes an upper base portion 80 on which the upper outer side cover 73 (FIG. 2) is mounted; and a lower base portion 81 on which the lower outer side cover 74 (FIG. 2) is mounted as integral parts thereof.

A profile of the upper base portion 80 and a profile of the lower base portion 81 are formed so as to be approximately aligned with a profile of the upper outer side cover 73 and a profile of the lower outer side cover 74, respectively, such that the upper base portion 80 and the lower base portion 81 overlap with the upper outer side cover 73 and the lower outer side cover 74 respectively.

The lower base portion 81 includes a plurality of fixing portions 82 to which the lower outer side cover 74 is fixed. A relatively large opening portion 81a which is covered by the lower outer side cover 74 is formed in the center of the lower base portion 81. In FIG. 3, parts which are disposed inside the opening portion 81a and are visible through the opening portion 81a are not shown in the drawing.

The upper base portion 80 includes a plurality of fixing portions 83 to which the upper outer side cover 73 is fixed. A front portion of the upper base portion 80 is fixed to a stay (not shown in the drawing) which is arranged in the vicinity of the front forks 11, 11 using a bolt 84.

The upper base portion 80 includes a base plate portion 85 (base portion) where a flat surface of the plate substantially faces in the vehicle width direction; and a projecting portion 86 which projects outward in the vehicle width direction from the base plate portion 85.

The projecting portion 86 is formed on a front portion of the upper base portion 80, and is positioned in front of the head pipe 14. Further, a rear opening 85a having a larger area than the projecting portion 86 as viewed in a side view is formed in the base plate portion 85 behind the projecting portion 86.

Figure 6:
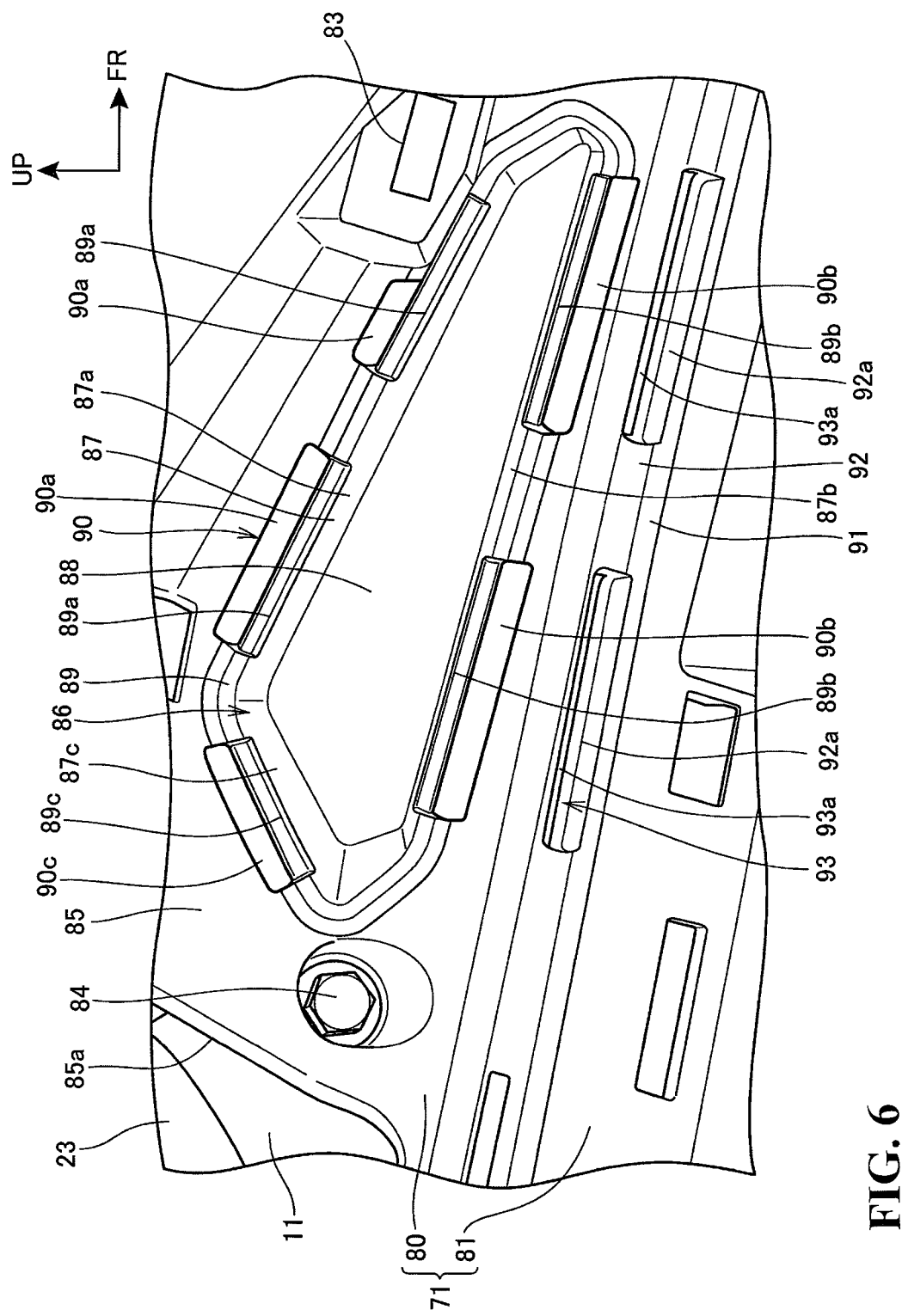
FIG. 6 is a side view showing a projecting portion and the surrounding of the projecting portion in FIG. 5 in an enlarged manner.
Figure 7:
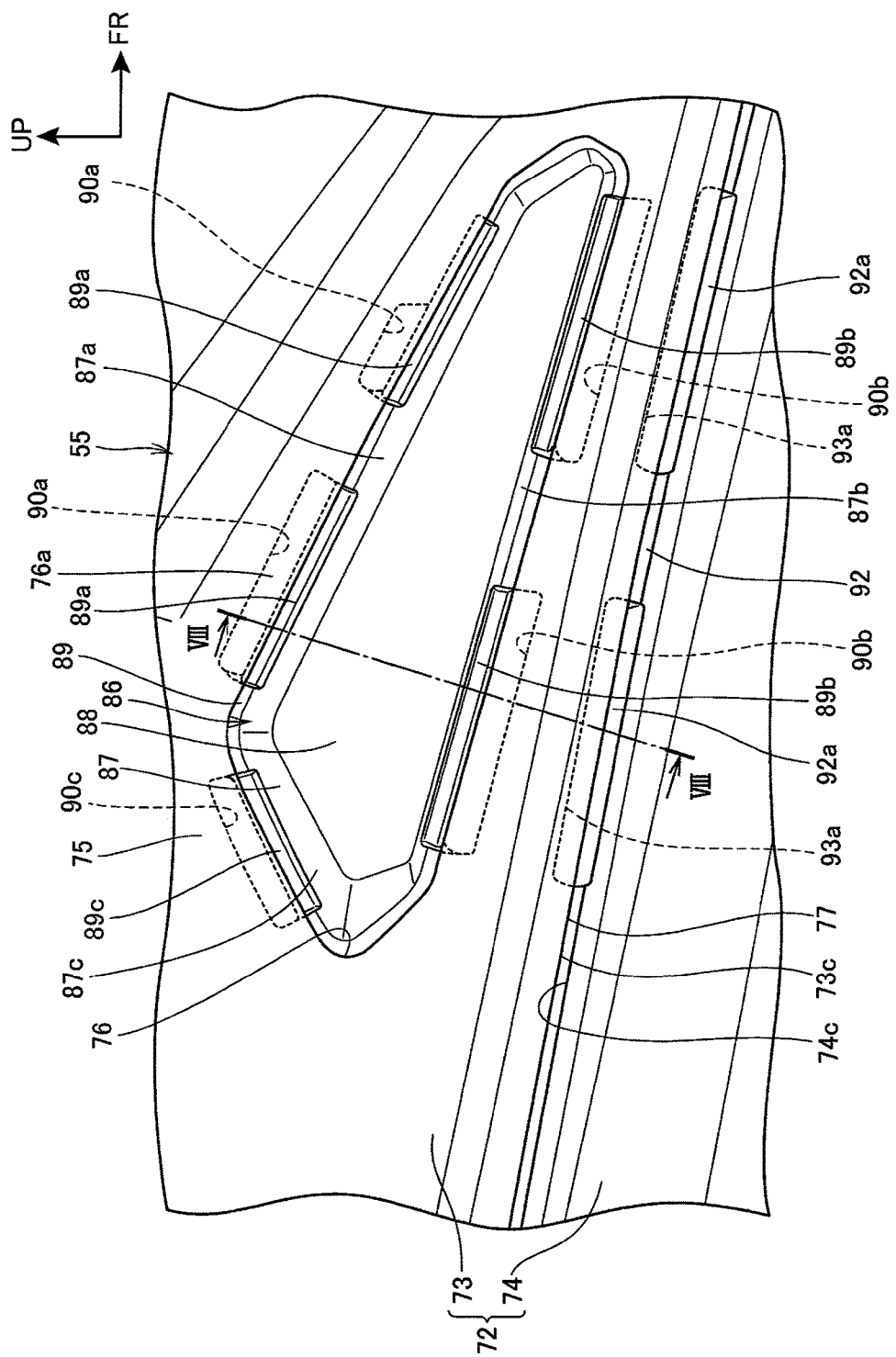
FIG. 7 is a side view showing the projecting portion and the surrounding of the projecting portion in an enlarged manner in a state where an outer side cover is mounted.
Figure 8:
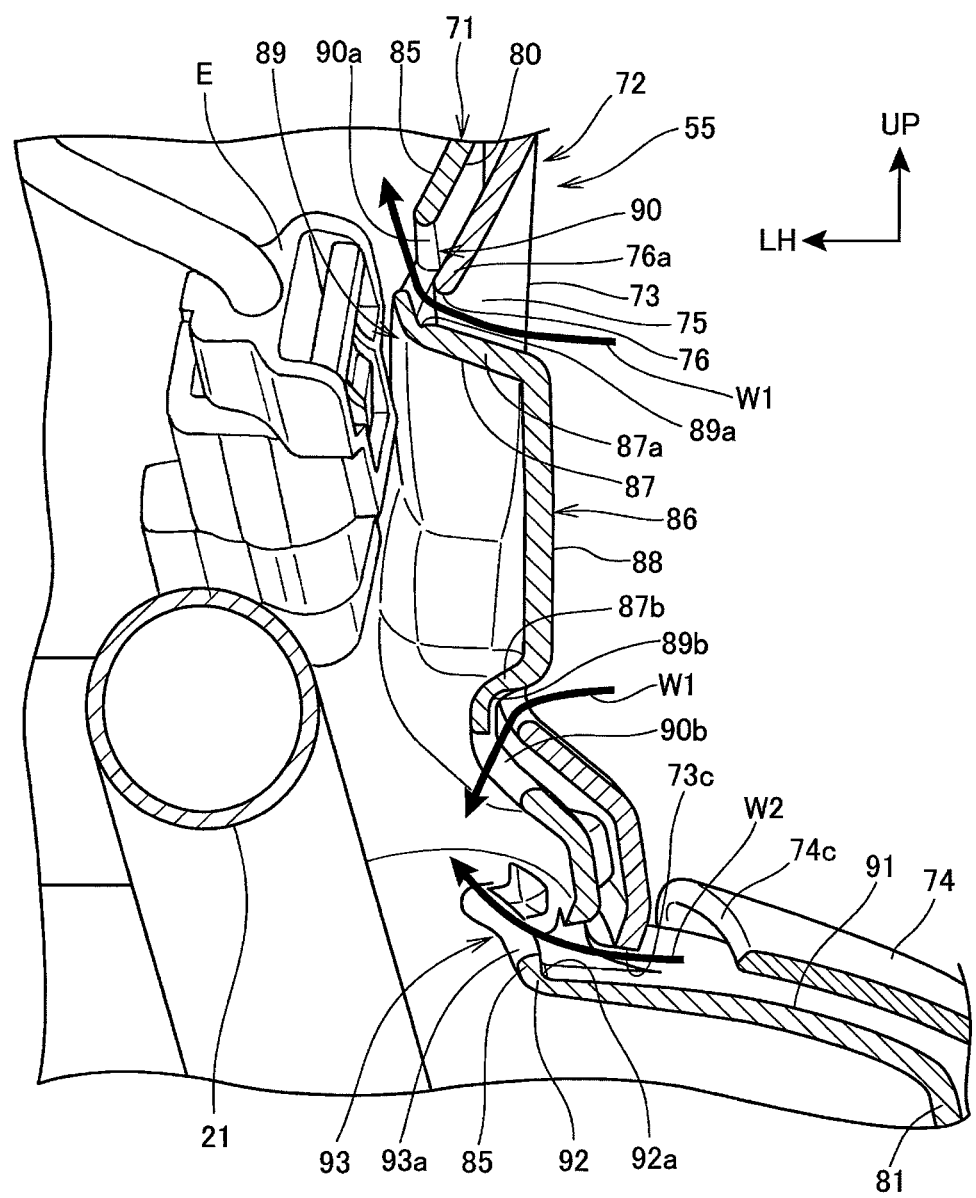
FIG. 8 is a cross-sectional view taken along a line VIII-VIII in FIG. 7.

FIG. 6 is a side view showing a peripheral portion of the projecting portion 86 in FIG. 5 in an enlarged manner. FIG. 7 is a side view showing the peripheral portion of the projecting portion 86 in an enlarged manner in a state where the outer side cover 72 is mounted. FIG. 8 is a cross-sectional view taken along a line VIII-VIII in FIG. 7.

As shown in FIG. 6 to FIG. 8, the projecting portion 86 is formed into a hollow columnar shape extending outward in the vehicle width direction. The projecting portion 86 includes a peripheral wall portion 87 for surrounding an axis of the projecting portion 86 in the projecting direction of the projecting portion 86, and a side wall portion 88 for closing an outer edge of the peripheral wall portion 87.

More specifically, the projecting portion 86 is formed by bending and extending the base plate portion 85 toward the outside in the vehicle width direction, and a bent portion 89 where the extending direction of the base plate portion 85 is changed toward the outside in the vehicle width direction is formed over the whole circumference of a proximal end portion of the peripheral wall portion 87. The bent portion 89 is formed into an annular shape so as to surround the peripheral wall portion 87 as viewed in a side view. The bent portion 89 is formed into a smoothly curved surface shape with a predetermined radius of curvature wherein the projecting portion 86 is formed by the bent portion 89.

Further, the projecting portion 86 is formed into an approximately wing shape in axial cross section as viewed in a side view. To be more specific, the wing shape of the projecting portion 86 is formed such that a width of the projecting portion 86 is small at a front end portion of the projecting portion and is gradually increased toward a rear end portion side of the projecting portion 86 and, at the same time, is arranged in a frontwardly inclined manner. The peripheral wall portion 87 having a wing shape has an upper surface portion 87a extending frontward and downwardly; a lower surface portion 87b formed in a frontwardly and downwardly extending manner with a gentler inclination than the upper surface portion 87a and merging with a front end of the upper surface portion 87a; and a rear surface portion 87c formed in a rearwardly and downwardly extending manner and connecting a rear end portion of the upper surface portion 87a and a rear end portion of the lower surface portion 87b to each other.

A plurality of openings 90 penetrating the upper outer side cover 73 are formed in the base plate portion 85 in the vicinity of the bent portion 89. The openings 90 are formed into a slit shape along an outer peripheral edge of the bent portion 89 which is formed into an annular shape as viewed in a side view and, at the same time, the plurality of openings 90 are formed at predetermined intervals in the circumferential direction of the bent portion 89. More specifically, the openings 90 is formed of a pair of upper openings 90a, 90a which is formed along a proximal end portion of the upper surface portion 87a of the peripheral wall portion 87; a pair of lower openings 90b, 90b which are formed along a proximal end portion of the lower surface portion 87b of the peripheral wall portion 87; and a rear opening 90c which is formed along a proximal end portion of the rear surface portion 87c of the peripheral wall portion 87.

The bent portion 89 further includes opening-side bent portions 89a, 89a which are contiguously formed with the upper openings 90a, 90a, opening-side bent portions 89b, 89b which are contiguously formed with the lower openings 90b, 90b; and an opening-side bent portion 89c which is contiguously formed with the rear opening 90c. The respective opening-side bent portions 89a, 89b, 89c are formed with radii of curvatures slightly larger than a radius of curvature of the bent portion 89 around the respective bent portions 89a, 89b, and 89c. However, the radii of curvatures of the respective opening-side bent portions 89a, 89b, and 89c may be changed when necessary. For example, the radii of curvatures of the whole bent portions 89 may be set equal.

As shown in FIG. 6 and FIG. 8, the lower base portion 81 is formed such that the lower base portion 81 projects more toward the outside in the vehicle width direction than the upper base portion 80 by one stage, and a lower edge of the lower base portion 81 and an upper edge of the upper base portion 80 are connected to each other by a plate-like connecting wall 91 extending in the vehicle width direction.

A front frame 21 which is mounted on the head pipe 14 and is positioned in front of the head pipe 14 is arranged inside the base side cover 71. Some parts such as the headlight 60 arranged in front of the head pipe 14 are supported on the front frame 21.

The connecting wall 91 is formed by bending and extending a lower edge of the base plate portion 85 of the upper base portion 80 toward the outside in the vehicle width direction. A bent portion 92 where the extending direction of the base plate portion 85 is changed toward the outside in the vehicle width direction is formed on a proximal end portion of the connecting wall 91. The bent portion 92 is formed into an approximately linear shape extending in the longitudinal direction such that the bent portion 92 extends frontward and downwardly as viewed in a side view. The bent portion 92 is formed into a smoothly curved shape with a predetermined radius of curvature.

A plurality of openings 93 which penetrate the upper outer side cover 73 are formed in the base plate portion 85 in the vicinity of the bent portion 92. The opening 93 is formed into a slit shape along an upper edge of the bent portion 92 which extends approximately linearly as viewed in a side view and, at the same time, the plurality of openings 93 are formed at predetermined intervals in the longitudinal direction. More specifically, the openings 93 include a pair of front openings 93a, 93a which is formed in the vicinity of the bent portion 92 below the projecting portion 86; and a plurality of rear openings 93b (FIG. 5) which are formed in the vicinity of the bent portion 92 behind the projecting portion 86.

The bent portion 92 further includes opening-side bent portions 92a, 92a which are contiguously formed with the front openings 93a, 93a, and an opening-side bent portion 92b which are contiguously formed with the respective rear openings 93b. The respective opening-side bent portions 92a, 92b are formed with a radius of curvature slightly larger than a radius of curvature of the bent portions 92 around the bent portions 92a, 92b. However, the radius of curvature may be changed when necessary. For example, radii of curvatures of the whole bent portions 92 may be set equal.

As shown in FIG. 7 and FIG. 8, the upper outer side cover 73 is mounted on the upper base portion 80 of the base side cover 71 such that the upper outer side cover 73 covers the upper base portion 80 from the outside in the vehicle width direction. The projecting portion 86 is inserted into the side surface opening 76 formed in the upper outer side cover 73 from the inside and extends toward the outside in the vehicle width direction. To be more specific, the projecting portion 86 is made to pass through the side surface opening 76 formed in the bottom portion of the recessed portion 75 having a funnel shape whose size is gradually decreased toward the inside in the vehicle width direction, and is positioned in a space formed in the inside of the recessed portion 75 of the upper outer side cover 73.

The upper outer side cover 73 is mounted in a slightly spaced-apart manner toward the outside in the vehicle width direction with respect to the upper base portion 80 except for a fixed portion thereof.

The side surface opening 76 is formed into an elongated hole shape having a size slightly larger than that of the peripheral wall portion 87 as viewed in a side view. Thus, the bent portion 89 is exposed to the outside through between a peripheral portion 76*a* of the side surface opening 76 and the peripheral wall portion 87. The side surface opening 76 is formed such that the peripheral portion 76*a* of the side surface opening 76 overlaps with the opening 90. The peripheral portion 76*a* overlaps with the upper openings 90*a*, 90*a*, the lower openings 90*b*, 90*b*, and the rear opening 90*c* from the outside so that the upper openings 90*a*, 90*a*, the lower openings 90*b*, 90*b*, and the rear opening 90*c* are concealed.

As shown in FIG. 7 and FIG. 8, the upper outer side cover 73 is mounted such that a gap is formed between the lower edge 73*c* of the upper outer side cover 73 and the connecting wall 91, and the bent portion 92 ranging from a front side to a back side is exposed to the outside from the gap. Further, the upper outer side cover 73 is mounted such that a lower edge portion of the upper outer side cover 73 overlaps with the opening 93. Since the lower edge portion of the upper outer side cover 73 overlaps with the front openings 93*a*, 93*a* and the rear opening 93*b* from the outside, the front openings 93*a*, 93*a* and the rear opening 93*b* are concealed.

By reference to FIG. 2 and FIG. 3, during operation of the motorcycle 1, a flow of air oncoming from a front side flows rearwardly along the beak-shaped cowl 70, the headlight 60, the front cowl 54, the wind screen 61 and the side covers 55, 55.

A portion of the flow of air which flows along the beak-shaped cowl 70 flows toward an upper outer side cover 73 side along the upper edge 70*a*. In this embodiment, the upper edge 70*a* is formed linearly in a frontward and downwardly inclined manner contiguously with the connecting line 77 of the outer side cover 72. Accordingly, it is possible to make a flow of air efficiently flow toward an upper outer side cover 73 side. Further, the upper outer side cover 73 is designed such that the upper outer side cover 73 extends frontward and downwardly. Thus, the upper outer side cover 73 can provide a design having a speed feeling whereby the external appearance can be enhanced.

A portion of the flow of air which flows toward an upper outer side cover 73 side flows into the recessed portion 75 and flows along the projecting portion 86. Another portion of the flow of air which flows toward an upper outer side cover 73 side flows through a gap formed between the lower edge 73*c* of the upper outer side cover 73 and the connecting wall 91 (FIG. 8) along the connecting line 77 (FIG. 2).

A flow of air which flows toward a projecting portion 86 side smoothly flows rearwardly along the projecting portion 86 having a wing shape. When a rider turns the motorcycle on a curve or the like, the rider tilts (banks) the motorcycle 1 with respect to contact points of the front wheel 2 and the rear wheel 3 which are brought into contact with the ground. In this case, as shown in FIG. 8, a flow of air W1 which is a portion of a flow of air which flows along the periphery of the projecting portion 86 flows into the inside of the upper outer side cover 73 through the side surface opening 76, flows along the opening-side bent portions 89*a*, 89*a*, the opening-side bent portions 89*b*, 89*b*, and the opening-side bent portion 89*c*, passes through the upper openings 90*a*, 90*a*, the lower openings 90*b*, 90*b* and the rear opening 90*c*, and flows into a space formed inside the side cover 55. The opening 90 is positioned on a downstream side of the opening-side bent portions 89*a*, 89*a*, the opening-side bent portions 89*b*, 89*b*, and the opening-side bent portion 89*c* in the flow of a flow of air at the time of banking the vehicle.

In this manner, when the motorcycle 1 is tilted, the flow of air W1 passes through the opening 90 and flows through the inside of the vehicle body. Thus, air resistance generated at the time of tilting the vehicle can be reduced whereby a turning performance of the vehicle is enhanced. In this embodiment, the flow of air W1 is straightened by being bent and made to flow along the opening-side bent portions 89*a*, 89*a*, the opening-side bent portions 89*b*, 89*b*, and the opening-side bent portion 89*c*. Thus, it is possible to make the flow of air W1 easily and smoothly flow toward the inside of the vehicle body so that a turning performance of the vehicle can be effectively enhanced. Further, the upper openings 90*a*, 90*a*, the lower openings 90*b*, 90*b*, and the rear opening 90*c* are concealed by the peripheral edge 76*a* of the side surface opening 76. Thus, an external appearance of the vehicle can be also enhanced. Further, the flow of air W1 is straightened by being bent and an energy of the flow of air W1 is lowered. Thus, it is possible to prevent a flow of air from strongly impinging on parts such as electric equipment E, for example, arranged inside the side cover 55.

When the motorcycle 1 banks, the more upper side a part of the motorcycle is disposed, the more a moving amount of the part of the motorcycle at the time of banking the motorcycle 1 becomes. In this embodiment, the bent portion 89 and the opening 90 are formed on and in the upper outer side cover 73. Thus, a resistance of a portion of the motorcycle which exhibits a large moving amount and receives a large resistance at the time of banking can be effectively reduced.

A flow of air W2 which is a portion of a flow of air which flows through the gap formed between the lower edge 73*c* of the upper outer side cover 73 and the connecting wall 91, when the vehicle banks, as shown in FIG. 8, flows along the opening-side bent portions 92*a*, 92*a* and the opening-side bent portion 92*b* (FIG. 2), passes through the front openings 93*a*, 93*a* and the rear opening 93*b*, respectively, and flows into the space formed inside the side cover 55. The opening 93 is positioned on a downstream side of the opening-side bent portions 92*a*, 92*a* and the opening-side bent portion 92*b* in the flow of the flow of air at the time of banking the vehicle.

In this manner, when the motorcycle 1 is tilted, the flow of air W2 passes through the opening 93, and passes through the inside of the vehicle body. Thus, an air resistance generated at the time of tilting the vehicle can be reduced whereby a turning performance can be enhanced. In this embodiment, the flow of air W2 is straightened by being bent and made to flow along the opening-side bent portions 92*a*, 92*a* and the opening-side bent portion 92*b*. Thus, it is possible to make the flow of air W2 smoothly flow into the inside of the vehicle body so that a turning performance can be effectively enhanced. Further, the front openings 93*a*, 93*a* and the rear opening 93*b* are concealed by the lower edge portion of the upper outer side cover 73. Thus, the external appearance can be also enhanced. Further, the flow of air W2 is straightened and an energy of the flow of air W2 is reduced to make it possible to prevent a flow of air from strongly impinging on parts such as the electric part E arranged inside the side cover 55, for example.

As has been described heretofore, according to the embodiment to which the invention is applied, the motorcycle 1 includes the head pipe 14; the main frames 15, 15 which extend rearwardly from the head pipe 14; and the side covers 55, 55 which cover the main frames 15, 15 from left and right sides, wherein the bent portions 89, 92 which are bent toward the outside in the vehicle width direction from the base plate portion 85 are formed on the side covers 55, 55, and the openings 90, 93 are formed in the base plate portion 85 positioned in the vicinity of the bent portions 89, 92. Accordingly, the external appearance can be enhanced by using the bent portions 89, 92 as accents and, at the same time, at the time of turning the motorcycle 1 in a tilted posture, a flow of air passes through the openings 90, 93 from the side covers 55, 55 and passes through the inside of the motorcycle 1. Thus, the resistance to turning is reduced whereby turning performance is enhanced. In such a configuration, the flow direction of the flow of air W1 and the flow of air W2 are changed by the bent portions 89, 92 and the flow of air W1 and the flow of air W2 flow through the openings 90, 93. Thus, it is possible to make the flow of air W1 and the flow of air W2 flow smoothly by straightening these winds W1, W2 whereby turning performance can be largely enhanced.

The upper openings 90a, 90a, the lower openings 90b, 90b, the rear opening 90c, and the front openings 93a, 93a are arranged at positions in front of the head pipe 14 as viewed in a side view. Thus, it is possible to straighten a strong a flow of airing on a front portion side of the motorcycle 1 by the bent portions 89, 92 whereby the flow of air can smoothly flow through the upper openings 90a, 90a, the lower openings 90b, 90b, the rear opening 90c, and the front openings 93a, 93a. Accordingly, the motorcycle 1 can enhance turning performance even with the configuration where relatively heavy parts such as the headlight 60 and the front cowl 54 are arranged in front of the head pipe 14.

The side covers 55, 55 include the base side cover 71 which includes the base plate portion 85; and the outer side cover 72 which covers the base side cover 71, and the openings 90, 93 are concealed by the outer side cover 72. Accordingly, it is possible to prevent the openings 90, 93 from being viewed from the outside by the outer side cover 72 whereby turning performance can be enhanced while ensuring external appearance.

The projecting portion 86 which projects toward the outside in the vehicle width direction from the base plate portion 85 is formed by the bent portion 89, and the projecting portion 86 has the approximately wing cross-sectional shape as viewed in a side view. Accordingly, a resistance generated by a flow of air toward the projecting portion 86 from a front side can be reduced. Accordingly, the external appearance can be enhanced by the projecting portion 86 and, at the same time, a resistance of the flow of air generated by the projecting portion 86 can be reduced.

The outer side cover 72 includes the upper outer side cover 73; and the lower outer side cover 74 positioned below the upper outer side cover 73, and the connecting line 77 formed by connecting the lower edge 73c of the upper outer side cover 73 and the upper edge 74c of the lower outer side cover 74 extends frontward and downwardly as viewed in a side view. Accordingly, the outer side cover 72 can provide a design having the feeling of speed to enhance the external appearance.

The beak-like cowl 70 having a beak shape as viewed in a side view is disposed below the headlight 60, and the upper edge 70a of the beak-like cowl 70 is contiguously formed with the connecting line 77. Accordingly, a design having a feeling of integrity can be formed on the front portion of the motorcycle 1 by the upper edge 70a of the beak-like cowl 70 and the connecting line 77. Thus, the external appearance can be enhanced.

The projecting portion 86 is positioned on the upper outer side cover 73. Thus, resistance generated at the upper portion of the motorcycle 1 where the resistance is increased at the time of turning the motorcycle 1 can be effectively reduced thus enhancing turning performance.

The projecting portion 86 is formed into a hollow columnar shape projecting toward the outside in the vehicle width direction, and the plurality of openings 90 are formed along the periphery of the proximal end portion of the projecting portion 86. Accordingly, the plurality of openings 90 can be effectively formed in the vicinity of the bent portion 89 and hence, turning performance of the motorcycle 1 can be enhanced.

The projecting portion 86 is made to pass through the side surface opening 76 formed in the outer side cover 72 and extends toward the outside in the vehicle width direction, and the opening 90 overlaps with the peripheral portion 76a of the side surface opening 76 from the inside as viewed in a side view. Thus, the plurality of openings 90 can be effectively formed in the proximal end portion side of the columnar projecting portion 86, and the plurality of openings 90 can be concealed with the simple constitution by the peripheral portion 76a of the side surface opening 76. Accordingly, it is possible to acquire both of turning performance and external appearance at the same time.

The above-mentioned embodiment merely shows one mode to which the invention is applied, and the invention is not limited to the above-mentioned embodiment.

In the above-mentioned embodiment, the explanation has made with respect to the case where the upper openings 90a, 90a, the lower openings 90b, 90b, the rear opening 90c, and the front openings 93a, 93a are arranged in front of the head pipe 14 as viewed in a side view. However, the invention is not limited to such a constitution, and the upper openings 90a, 90a, the lower openings 90b, 90b, the rear opening 90c, and the front openings 93a, 93a may be arranged at positions where these openings at least partially overlap with the head pipe 14 as viewed in a side view.

The beak-like cowl 70 may be integrally formed with the front cowl 54 or the side cover 55 or may be formed as a body separate from the front cowl 54 or the side cover 55.

In the above-mentioned embodiment, the explanation has been made by taking a motorcycle as an example of a saddle-ride-type vehicle. However, the saddle-ride-type vehicle may be a vehicle having three or more wheels, for example.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A side cover structure of a saddle-ride vehicle includes a head pipe; a frame extending rearwardly from the head pipe and side covers for covering the frame from left and right sides, wherein:

a bent portion is bent toward an outside in a vehicle width direction from a base portion, said bent portion being formed on the side cover, and an opening is formed in the base portion positioned in the vicinity of the bent portion;

said side cover including a base side cover which includes the base portion and an outer side cover for covering the base side cover, with said opening being concealed by the outer side cover;

said outer side cover including an upper outer side cover and a lower outer side cover positioned below the upper outer side cover; and a connecting line formed by connecting a lower end of the upper outer side cover and an upper end of the lower outer side cover extends frontward and downwardly as viewed in a side view.

2. The side cover structure of a saddle-ride vehicle according to claim 1, wherein the opening is arranged at a position adjacent to the head pipe as viewed in a side view.

3. The side cover structure of a saddle-ride vehicle according to claim 2, wherein a projecting portion which projects toward the outside in the vehicle width direction from the base portion is formed by the bent portion, and the projecting portion has an approximately wing cross-sectional shape as viewed in a side view.

4. The side cover structure of a saddle-ride vehicle according to claim 1, wherein a cowl having a beak shape as viewed in the side view is disposed below a headlight, and an upper edge of the cowl is contiguously formed with the connecting line.

5. The side cover structure of a saddle-ride vehicle according to claim 1, wherein the projecting portion is positioned on the upper outer side cover.

6. The side cover structure of a saddle-ride vehicle according to claim 4, wherein the projecting portion is positioned on the upper outer side cover.

7. The side cover structure of a saddle-ride vehicle according to claim 1, wherein the projecting portion is made to pass through a side surface opening formed in the outer side cover and extends toward the outside in a vehicle width direction, and the opening overlaps with a peripheral portion of the side surface opening from the inside as viewed in a side view.

8. A side cover structure of a saddle-ride vehicle comprising:
   a head pipe;
   a frame extending rearwardly from the head pipe;
   side covers for covering the frame on left and right sides;
   a bent portion bent toward an outside in a vehicle width direction from a base portion is formed on the side cover; and
   an opening is formed in the base portion positioned in the vicinity of the bent portion
   said side cover including a base side cover which includes the base portion and an outer side cover for covering the base side cover, said opening being concealed by the outer side cover;
   wherein the outer side cover includes an upper outer side cover and a lower outer side cover positioned below the upper outer side cover; and
   a connecting line formed by connecting a lower end of the upper outer side cover and an upper end of the lower outer side cover extends frontward and downwardly as viewed in a side view.

9. The side cover structure of a saddle-ride vehicle according to claim 8, wherein the opening is arranged at a position adjacent to the head pipe as viewed in a side view.

10. The side cover structure of a saddle-ride vehicle according to claim 8, wherein a projecting portion which projects toward the outside in the vehicle width direction from the base portion is formed by the bent portion, and the projecting portion has an approximately wing cross-sectional shape as viewed in a side view.

11. The side cover structure of a saddle-ride vehicle according to claim 8, wherein a cowl having a beak shape as viewed in a side view is disposed below a headlight, and an upper edge of the cowl is contiguously formed with the connecting line.

12. The side cover structure of a saddle-ride vehicle according to claim 8, wherein the projecting portion is positioned on the upper outer side cover.

13. A side cover structure of a saddle-ride vehicle includes a head pipe; a frame extending rearwardly from the head pipe and side covers for covering the frame from left and right sides, wherein:
   a bent portion is bent toward an outside in a vehicle width direction from a base portion, said bent portion being formed on the side cover, and an opening is formed in the base portion positioned in the vicinity of the bent portion; and
   a projecting portion, projecting toward the outside in the vehicle width direction from the base portion, is formed by the bent portion, said projecting portion having an approximately wing cross-sectional shape as viewed in a side view;
   said projecting portion being formed into a hollow columnar shape projecting toward the outside in the vehicle width direction, and a plurality of openings are formed along a periphery of a proximal end portion of the projecting portion.

14. The side cover structure of a saddle-ride vehicle according to claim 13, wherein the opening is arranged at a position adjacent to the head pipe as viewed in a side view.

15. The side cover structure of a saddle-ride vehicle according to claim 14, wherein a projecting portion which projects toward the outside in the vehicle width direction from the base portion is formed by the bent portion, and the projecting portion has an approximately wing cross-sectional shape as viewed in a side view.

16. The side cover structure of a saddle-ride vehicle according to claim 13, wherein a cowl having a beak shape as viewed in the side view is disposed below a headlight, and an upper edge of the cowl is contiguously formed with the connecting line.

17. The side cover structure of a saddle-ride vehicle according to claim 13, wherein the projecting portion is positioned on the upper outer side cover.

18. The side cover structure of a saddle-ride vehicle according to claim 16, wherein the projecting portion is positioned on the upper outer side cover.

19. The side cover structure of a saddle-ride vehicle according to claim 13, wherein the projecting portion is made to pass through a side surface opening formed in the outer side cover and extends toward the outside in a vehicle width direction, and the opening overlaps with a peripheral portion of the side surface opening from the inside as viewed in a side view.

* * * * *